Sept. 29, 1925.
J. KONAR
FOUR-CYCLE GAS ENGINE
Filed Aug. 16, 1922
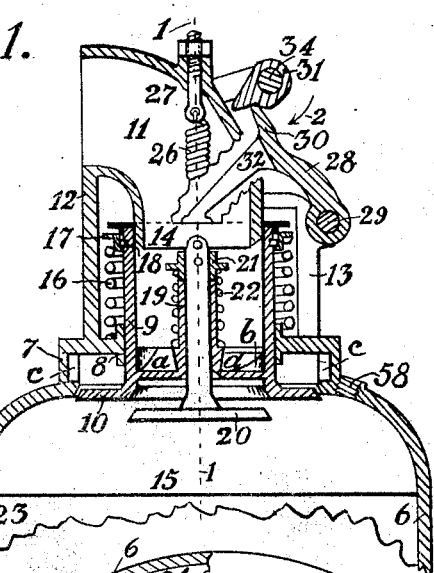
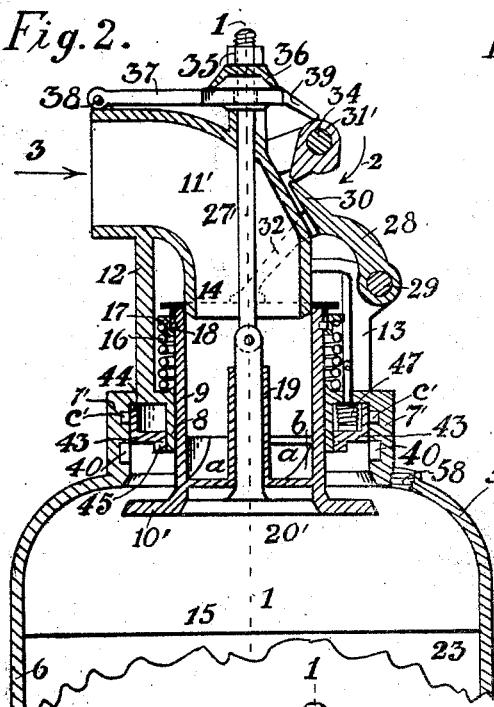
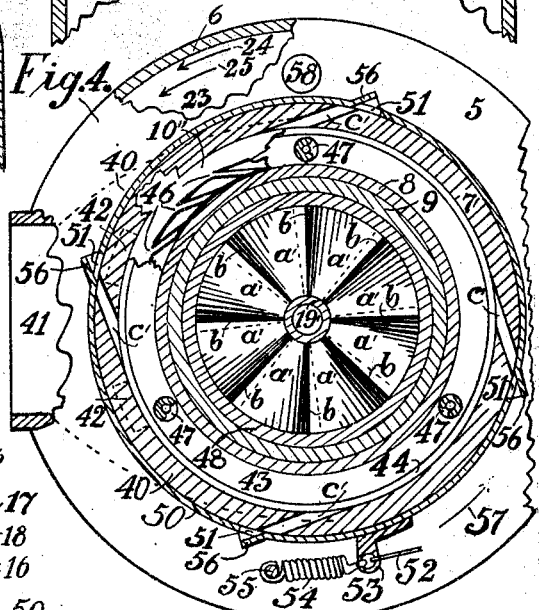
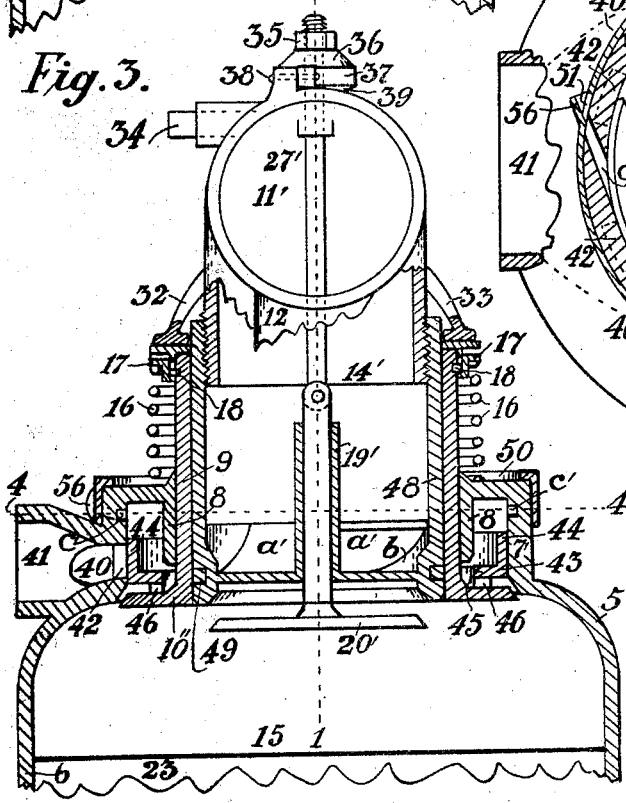
INVENTOR.
John Konar Patented Sept. 29, 1925.

1,555,804

UNITED STATES PATENT OFFICE.

JOHN KONAR, OF CHICAGO, ILLINOIS.

FOUR-CYCLE GAS ENGINE.

Application filed August 16, 1922. Serial No. 582,301.

*To all whom it may concern:*

Be it known that I, JOHN KONAR, a citizen of the United States, residing at Chicago, county of Cook, and State of Illinois, have invented a new and useful Four-Cycle Gas Engine, of which the following is a specification.

My invention relates to four cycle gas engines; and the objects of my invention are, first, to dispose an overhead exhaust valve coaxially above the cylinder and to provide in the middle of the exhaust valve a hollow stem and a valved opening to serve as a fuel vent whereby the interior of the valves affords a smooth and rounded passage to the cylinder head and whereby both valves are cooled by volatilizing the heavier fuel particles of the new charge at the very entry to the interior of the cylinder; second, to arrange screw blades inside said fuel vent for splitting, turning and volatilizing the bottom heavy fuel mixture in slices over warmed surfaces to increase the thoroughness and the turbulence of the mixture; and, third, to provide a thin and uniform layer of air between the combustible charge and the inner wall of the cylinder and the cylinder head and thereby obtain a costless internal cooling of the engine with prevention of carbon setting and leakage of fuel around the piston.

My invention is exemplified in combination with an upper portion of a vertical four cycle gas engine and is illustrated in the accompanying drawings, in which—

Fig. 1 is a vertical, partly sectional side view of an upper portion of an upright four cycle gas engine, embodying a simple type of my invention and shown at the beginning of the intake stroke; Fig. 2 is a complemental modification of Fig. 1, showing the engine near the end of the exhaust stroke and having a cam drive with the intake valve and a segregate exhaust pass with a throttle; Fig. 3 is an enlarged and partly sectional side view to Fig. 2, as seen in the direction of arrow 3, and is showing the engine at the beginning of the intake stroke and having a nipple extension 48 and an air damper 50; and Fig. 4 is a portion of a transverse sectional top view of the engine taken on the line 4—4 of Fig. 3. Similar reference characters refer to similar parts throughout the several views.

In the round cylinder head 5 and coaxially with the axis 1 of the cylinder 6 is an annular throat 7 with a crown, bearing a guide box 8 for the tubular stem 9 of the puppet exhaust valve 10. The fuel-port 11, supported by two braces 12 and 13 above the crown and provided with a sideways opening for a suitable fuel admission, has a nipple 14 telescoping inside the upper end of the tubular stem to afford a fuel vent into the chamber 15 of the engine by an annular perforation in the disk of the exhaust valve 10. On the crown bears a helical compression spring 16 to press against the collar 17 locked by the split ring 18 to the top end of the tubular stem whereby the exhaust valve is closed.

From the inside of the lower end of the tubular stem are extended eight screw-blades $a$—$a$ carrying the upward directed nave box 19 for guiding the stem of the puppet intake valve 20. A spring flange 21 is pinned to the stem end at a measured elevation above the nave box 19 and is supported by the sensitive helical compression spring 22 whereby the intake valve is seated and the fuel vent is closed. The screw blades are slanting downward helically in an anticlockwise direction and split and turn the compactly arriving fuel mixture in thin slices over the surfaces of the blades and of the disk of the intake valve 20 whereby the mixture is whirled into a vortex around the longitudinal axis 1 of the cylinder 6 to turn into a cylindrically rotating form which elongates behind the receding piston head 23 commonly movable by a not shown crank shaft of the engine; the movement of the piston head is marked by its varying distances from the cylinder head as shown in the respective figures. The screw blades absorb heat from the adjacent valves which are heated by the fired charge. The volatile portion of the charge easily turns on the screw-blades but fuel droplets pierce the bending volatile slices of fuel mixtures and smash on the hot surfaces of the screw blades and of the intake valve to completely vaporize into the turbulent volatile charge which thence fuses centrifugally in the form of a downward rotating cylinder within the wall of the chamber 15.

In the wall around the throat 7 is arranged equidistantly and in uniform elevation a plurality of open air inlets $c$—$c$, more spacious but otherwise similar to the inlets c'—c' of the enlarged Fig. 4, and inclined tangentially to the inner periphery of the throat in an anti-clockwise direction so as to switch the ingoing air streaks into the chamber 15 by a turning motion over the disk of the exhaust valve which remains partly open after the exhaust stroke for such scant admission of air. From the disk of the exhaust valve the whirling air then spreads as a thin layer near the walls of the chamber 15 and thereby separates the fuel charge rotating in same direction from contact with the metallic walls of the cylinder, the cylinder head and the piston. The circulating motion of the layer of air in contact with said metallic wall is indicated by the arrow 24 in Fig. 4, while the arrow 25 indicates the rotation of the cylindrical form of the fuel mixture within the peripherally exterior layer of air.

With undue high speed of the engine the undue suction depresses the intake valve 20 to quickly set the spring disk 21 on top of the nave box 19, overloading thereby the exhaust valve that is also pulled down by an unduly high speed suction and then easily widens its gap against the resistance of the spring 16 for admitting a thicker air layer around the fuel charge, while the seated spring disk 21 checks the intake valve against enlarging the fuel admission (see Fig. 1). Thereby a measured limitation of space and travel between spring disk and the top of the nave-box reduces at high speeds the fuel intake and affords a speed limit with my engine and thereby an economical automatic governing which may be modified by connecting the stem end of the intake valve with the lower end of the helical extension spring 26, attached to an eye-bolt 27, adjustably suspended above the fuel-pass by a lock nut.

The exhaust with my engine, as shown in Fig. 1, is through the air inlets c—c, that for such purpose are more numerous and more spacious, than the four air inlets c'—c' shown in Fig. 4.

When the exhaust valve jerks upward from its wide exhaust opening of numeral 10' of Fig. 2 to the scant air charging state 10 of Fig. 1, the intake valve 20 remains for intake in a lowered position partly by its gravitation and by the setting in suction and mainly by the resistance of its own resting momentum, opposing even a strong nave-spring 22, whereby the upward departure of the exhaust valve from the intake valve automatically opens the fuel vent.

The forked rocker 28 has:—a fulcrum pin 29 bearing on the brace 13; a fork head 30 actuated by the cam 31; and two prongs 32 and 33 spread out to encompass the nipple 14 and to press from two opposite sides on the shielded upper end of the tubular stem 9 for lowering the ring valve for exhaust and for keeping it partly lowered for the consecutive air intake. The cam 31 moves with the cam shaft 34 mounted on a fixed brace and turned in the direction of the arrow 2 by a suitable transmission from the not shown crank shaft of the engine in half time relation therewith.

The cam 31 has besides its high peak for exhaust also a smaller radius hump, shown engaged in Fig. 1 by the head 30 to keep down the rocker and therewith the exhaust valve to only a narrow opening for a scant air admission to form a layer of air between the fuel charge and the interior wall of the cylinder.

For a more positive timing the stem end of the intake valve 20' in Fig. 2 is connected with the lengthened eye-bolt 27', movably projecting above the fuel-port 11' and rested by the lock-nut 35 on the elastic cushion 36 above the lever 37 bearing with one end on a bracket pin 38 and extending its actuated end 39 towards the dual service cam 31', whereby the high peak of the cam raises the lever 37 after intake to close the intake valve 20' from the open intake position shown in Fig. 3; thereafter the intake valve stays closed by internal chamber pressure during the consecutive three cycles to easily depart again from the exhaust valve by the suction of the intake stroke without the obstruction of a suspending spring.

My gas engine of the simplified construction as shown in Fig. 1, can only be used in open air with unrestricted exhaust escape through the air inlets c—c. Where piping away of the deadly exhaust gases is necessary I provide, as shown in Figs. 2, 3, and 4, the throat 7' with a segregated exhaust pass 40 and an outlet 41 adapted for pipe extension. The staffs 42 are over bridging the wide portion of the exhaust pass to serve as slides for the hoop-like throttle 43 that has above its outer periphery an upturned annular gate-rim 44 externally equal to the inner periphery of the throat; below the inner periphery of the throttle is a spout-rim 45 with an opening equal to the outer periphery of the inverted end of the guide-box 8, whereby the throttle by sliding up and down alternately closes and opens the air inlets c' or the exhaust pass 40. The spout-rim has a plurality of slots 46 inclined tangentially to the periphery of the spout in an anticlockwise direction, as the imprint of the slotted spout-rim on the ring-valve in Fig. 4 is showing through an opening in the throttle 43. When the exhaust valve opens to release the exhaust gases, as shown in Fig. 2, the gas pressure pushes the throttle upward to telescope over said inverted end of the guide-box 8, to seal the air inlets c', to simultaneously uncover the entire exhaust pass 40, and to compress against the crown three helical compression springs 47 that after exhaust quickly push the throttle down again to set the spout base on the meanwhile partly upward moved exhaust valve whereby the exhaust pass is closed by the gate rim 44 and the upper spout rim is lowered below the guide-box 8 to open thereunder an annular pass around said tubular stem for letting air into the slots 46, as shown in Fig. 3; the air whirls from the tangential air inlets $c'$—$c'$ centripetally anticlockwise into said annular pass around the tubular stem and turns through the slots 46 into a uniform anticlockwise fusion over the exhaust valve and around the walls of the chamber 15 whereby the fuel mixture is separated from contact with said walls by a thin layer of air. After intake the throttle is raised by the closing exhaust valve and then is ready again for the next exhaust release.

The nipple 14' of Fig. 3 has a downward extension 48 bearing the screw blades $a'$ with the nave box 19' and the intake valve 20' whereby the weight of the exhaust valve 10' and its area when opening against the exhaust pressure, is reduced below that of the valve 10. A piston ring 49 around the end of the nipple-extension 48 improves the sealing between said extension and the tubular stem.

The annular air damper 50 surrounds rotatably the upper portion of the throat of Figs. 3 and 4 and has four slits 51 with dented hoods 56 to register with the air-inlets $c'$—$c'$ when turned away in the direction of arrow 57 by the pull of the wire 52 on the lever 53 against the opposing helical extension spring 54, attached to the stay 55. By slackening the wire 52 the spring 54 is set free to return the damper for sealing the air inlets to thereby reduce or avoid entirely said air admission and enrich the fuel intake during priming of the engine or for other temporary purposes.

With the starting intake stroke the exhaust residue is immediately forced underneath the intake valve 20 to gradually get absorbed by the whirling fuel mixture which turns into a cylindrical form extending downward with the crankward motion of the piston head. The base of the downward rotating cylinder of fuel mixture with its inner influx of residual gas and its outer layer of air is continuously introverting during intake time towards the center of the piston head to turn thereinto a vehement vortex motion and thereby blend into a thoroughly vaporized and turbulent mixture when filling the inner interior of the cylinder, while at the end of the intake stroke only the outer thin layer of air around the fuel charge and adherent to the inner metallic wall of the chamber 15 remains free of fuel and in an incombustible condition to protect the wall against carbon setting and overheating, to prevent leakage of fuel around the piston and to expand by the heat of the fire for affording energy that is otherwise lost by the usual external cooling system.

The number of the screw-blades is optional; their pitch may be reduced and their double decked ring sectors $b$—$b$ may be enlarged by widening the screw-blades, when a very speedy rotation of the vortex and a large evaporating area is wanted, as for instance with kerosene or the like heavy fuel; vice versa the screw passages between the blades formed by the double decked sectors $b$—$b$ may be abandoned by reducing the number of the screw-blades, that also may have a steeper helical drop when a reduced rotation of the fuel vortex and a less obstructed charge intake is desired. The valves may be actuated by other means, besides the ones specified, without limiting my invention.

What I claim as new and desire to secure by Letters Patent, is:—

1. In a four cycle gas engine in combination a cylinder, a cylinder head having an overhead exhaust throat closed by a puppet exhaust valve opening inwardly into the cylinder, a hollow stem and a valved perforation in the middle of the stem of said exhaust valve to serve as a fuel inlet, a fuel port having a nipple telescoping within said hollow stem, in the wall of said exhaust throat a plurality of air inlets, and means to keep the exhaust valve partly open during the intake stroke whereby from said air inlets a thin layer of air may be provided between the fuel charge and the walls of the cylinder and of the cylinder head.

2. In a four cycle gas engine in combination a cylinder, a cylinder head having an overhead exhaust throat closed by a puppet exhaust valve opening inwardly into the cylinder, a hollow stem and a valved perforation in the middle of the stem of said exhaust valve to serve as a fuel inlet, a fuel port having a nipple telescoping within said hollow stem, in the wall of said exhaust throat a plurality of tangentially slanting air inlets, and means to keep the exhaust valve partly open during the intake stroke whereby from said air inlets a thin layer of air may be provided between the fuel charge and the walls of the cylinder and of the cylinder head.

3. In a four cycle gas engine in combination a cylinder, a cylinder head having an overhead exhaust throat closed by a puppet exhaust valve opening inwardly into the cylinder and therewith coaxially aligned, a hollow stem and a valved perforation in the middle of the stem of said exhaust valve to serve as a fuel inlet, a fuel port having a nipple telescoping within said hollow stem, and a plurality of helically inclined screw blades located inside said tubular stem to absorb heat from the tubular stem and from the exhaust valve and to split and turn the compact fuel mixture in slices over thus heated surfaces of said screw blades whereby the heavier fuel particles are volatilized and the vapor thereof is thoroughly mixed with the main volatile charge by the warming and turning action of the screw blades.

4. In a four cycle gas engine in combination a cylinder, a cylinder head having an overhead exhaust throat closed by a puppet exhaust valve opening inwardly into the cylinder, a hollow stem and a valved perforation in the middle of the stem of said exhaust valve to serve as a fuel inlet, a fuel port having a nipple telescoping within said hollow stem, a number of helically inclined screw blades located inside said tubular stem to split and turn the compact fuel mixture in slices over warm surfaces whereby the heavier fuel particles are volatilized and the vapor thereof is thoroughly mixed with the volatile charge in the interior of the cylinder by a turbulent tornado-like action and whereby also the charge is turned into a cylindrically rotating form within the wall of the cylinder, in the wall of said throat a plurality of tangentially slanting air inlets and means to keep the exhaust valve partly open during the intake stroke whereby a uniformly thin layer of air is provided between the rotating fuel charge and the walls of the cylinder and of the cylinder head.

5. In a four cycle gas engine in combination a cylinder, a cylinder head having an overhead exhaust throat closed by a puppet exhaust valve opening inwardly into the cylinder, a hollow stem and a valved perforation in the middle of the stem of said exhaust valve to serve as a fuel inlet, a fuel port having a nipple telescoping within said hollow stem, means to turn the fuel mixture in said fuel inlet, in the wall of said exhaust throat a plurality of air inlets, and means to keep the exhaust valve partly open during the intake stroke whereby from said air inlets a thin layer of air may be provided between the fuel charge and the walls of the cylinder and of the cylinder head.

6. In a four cycle gas engine in combination a cylinder, a cylinder head having an overhead exhaust throat closed by a puppet exhaust valve opening inwardly into the cylinder, a hollow stem and a valved perforation in the middle of the stem of said exhaust valve to serve as a fuel inlet, a fuel port having a nipple telescoping within said hollow stem and extending inside said perforation in the stem of the exhaust valve, a puppet intake valve to close said nipple and to open inwardly into said cylinder, and a plurality of helically inclined screw blades affixed to the inside of said nipple to absorb heat from the exhaust valve and to split and turn the fuel mixture in slices over thus heated surfaces of the screw blades for volatilizing the heavier fuel particles into a thoroughly mixed and turbulent fuel charge.

7. In a four cycle gas engine in combination a cylinder, a cylinder head having an overhead exhaust throat closed by a puppet exhaust valve opening inwardly into the cylinder, a hollow stem and a valved perforation in the middle of the stem of said exhaust valve to serve as a fuel inlet, a fuel port having a nipple telescoping within said hollow stem, a cam actuated rocker to open the exhaust valve and to reduce the opening during the intake stroke, and a plurality of tangentially slanting air inlets in the wall of said exhaust throat, whereby a thin layer of air may be provided between the fuel charge and the walls of the cylinder and the cylinder head.

8. In a four cycle gas engine in combination a cylinder, a cylinder head having an overhead exhaust throat closed by a puppet exhaust valve opening inwardly into the cylinder, a hollow stem and a valved perforation in the middle of the stem of said exhaust valve to serve as a fuel inlet, a fuel port having a nipple telescoping within said hollow stem, in the wall of said exhaust throat a plurality of tangentially slanting air inlets, means to keep the exhaust valve partly open during the intake stroke whereby from said air inlets a thin layer of air may be provided between the fuel charge and the walls of the cylinder and of the cylinder head, an exhaust pass from the throat below said air inlets, and a movable throttle within said throat to alternately close and open said exhaust pass and said air inlets.

9. In a four cycle gas engine in combination a cylinder, a cylinder head having an overhead exhaust throat closed by a puppet exhaust valve opening inwardly into the cylinder, a hollow stem and a valved perforation in the middle of the stem of said exhaust valve to serve as a fuel inlet, a fuel port having a nipple telescoping within said hollow stem, in the wall of said exhaust throat a plurality of tangentially slanting air inlets, means to keep the exhaust valve partly open during the intake stroke whereby from said air inlets a thin layer of air may be provided between the fuel charge and the walls of the cylinder and of the cylinder head, and a damper to said air inlets.

JOHN KONAR.